United States Patent
Xu et al.

(10) Patent No.: US 9,922,223 B2
(45) Date of Patent: Mar. 20, 2018

(54) MULTIMEDIA SERVICE PUSHING METHOD AND SYSTEM BASED ON TWO-DIMENSIONAL CODE

(71) Applicant: SHENZHEN SKYWORTH-RGB ELECTRONIC CO., LTD, Shenzhen (CN)

(72) Inventors: Yaoling Xu, Shenzhen (CN); Zhilong Hou, Shenzhen (CN)

(73) Assignee: SHENZHEN SKYWORTH-RGB ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 15/318,971

(22) PCT Filed: Sep. 15, 2015

(86) PCT No.: PCT/CN2015/089580
§ 371 (c)(1),
(2) Date: Dec. 14, 2016

(87) PCT Pub. No.: WO2016/197473
PCT Pub. Date: Dec. 15, 2016

(65) Prior Publication Data
US 2017/0140190 A1 May 18, 2017

(30) Foreign Application Priority Data
Jun. 9, 2015 (CN) .......................... 2015 1 03108135

(51) Int. Cl.
*G06F 17/00* (2006.01)
*G06K 7/14* (2006.01)
(Continued)

(52) U.S. Cl.
CPC ..... *G06K 7/1417* (2013.01); *G06F 17/30879* (2013.01); *G06K 19/06037* (2013.01)

(58) Field of Classification Search
CPC ........... G06F 17/30879; G06F 19/3406; G06F 19/3418; G06Q 30/0601; G06Q 30/02;
(Continued)

(56) References Cited

U.S. PATENT DOCUMENTS

| | | | | |
|---|---|---|---|---|
| 6,854,641 | B1 * | 2/2005 | Takagi | ................ G06Q 10/10 235/375 |
| 2013/0032634 | A1 * | 2/2013 | McKirdy | ........... G06Q 30/0271 235/375 |

(Continued)

FOREIGN PATENT DOCUMENTS

| | | |
|---|---|---|
| CN | 102737318 A | 10/2012 |
| CN | 102930460 A | 2/2013 |

(Continued)

OTHER PUBLICATIONS

The World Intellectual Property Organization (WIPO) International Search Report for PCT/CN2015/089580 dated Mar. 1, 2016 pp. 1-6.

*Primary Examiner* — Thien M Le
(74) *Attorney, Agent, or Firm* — Anova Law Group, PLLC (57) ABSTRACT

The invention discloses a multimedia service pushing method and a multimedia service pushing system based on two-dimensional codes. The multimedia service pushing method comprises the steps that: a multimedia terminal receives multimedia content and multimedia service information sent by a multimedia server, generates a two-dimensional code image according to the multimedia service information, and overlaying the two-dimensional code image on the multimedia content for display; when a scanning terminal detects the two-dimensional code image on the multimedia terminal, the scanning terminal parses the two-dimensional code image to obtain a service command, sends a service request to a service server according to the service command, and obtains service content corresponding to the (Continued)

service command; and the scanning terminal or the multimedia terminal receives the service content and displays the service content. The multimedia service pushing method and the multimedia service pushing system based on the two-dimensional codes achieve the effect of automatically acquiring single or multiple pieces of service content corresponding to the multimedia service information through scanning and parsing the two-dimensional code images via the scanning terminal, reduces the space occupation of the multimedia service information, is convenient to operate and control, and brings great convenience to users.

18 Claims, 5 Drawing Sheets

(51) Int. Cl.
    *G06K 19/06*     (2006.01)
    *G06F 17/30*     (2006.01)
(58) Field of Classification Search
    CPC .......... G06Q 30/0207; G06Q 30/0239; G06Q 30/0241; G06Q 30/0263; G06K 19/06028; G06K 7/10722; G06K 7/1413

USPC ........................................................ 235/375
See application file for complete search history.

(56) References Cited

U.S. PATENT DOCUMENTS

| | | | |
|---|---|---|---|
| 2013/0095864 A1* | 4/2013 | Marovets | H04W 4/14 455/466 |
| 2014/0217164 A1* | 8/2014 | Sweeney | G06F 17/30879 235/375 |
| 2015/0008257 A1* | 1/2015 | Beadles | G06F 17/30879 235/375 |

FOREIGN PATENT DOCUMENTS

| | | |
|---|---|---|
| CN | 103763624 A | 4/2014 |
| CN | 104320678 A | 1/2015 |
| CN | 104683878 A | 6/2015 |

* cited by examiner

MULTIMEDIA SERVICE PUSHING METHOD AND SYSTEM BASED ON TWO-DIMENSIONAL CODE

CROSS-REFERENCES TO RELATED APPLICATIONS

This application is a national stage application of PCT Patent Application No. PCT/CN2015/089580, filed on Sep. 15, 2015, which claims priority to Chinese Patent Application No. 2015103108135, filed on Jun. 9, 2015, the content of all of which is incorporated herein by reference.

FIELD OF THE INVENTION

The present invention relates to the field of multimedia technology, and, more particularly, to a multimedia service pushing method based on two-dimensional code and the system thereof.

BACKGROUND

In current technologies, when playing a multimedia content, such as a plurality of advertisements, newsletters and other multimedia services, most of them are directly inserted into the multimedia content for delivering, and directly displayed on a display screen of a terminal, making a consumer receive them passively; these multimedia services have either a large capacity, occupying too much multimedia content playback time or space, or a small multimedia content capacity, leading to an unclear expression and making a poor advertisement displaying effect.

Therefore, the current technology needs to be improved and developed.

BRIEF SUMMARY OF THE DISCLOSURE

According to the above described defects, the purpose of the present invention is providing a multimedia service pushing method based on two-dimensional code and the system thereof, in order to solve the problem in the prior arts of either occupying too much multimedia content playback time or space due to a large capacity, or leading to an unclear expression and making a poor advertisement displaying effect due to a small multimedia content capacity, when a multimedia terminal is displaying an advertisement or other multimedia service.

In order to achieve the above mentioned goals, the technical solution of the present invention to solve the technical problems is as follows:

A multimedia service pushing method based on two-dimensional code, wherein, it comprises the steps that:

a multimedia terminal receives both multimedia content and multimedia service information sent from a multimedia server, generates a two-dimensional code image according to the multimedia service information, and overlays the two-dimensional code image onto the multimedia content for display;

when a scanning terminal detects the two-dimensional code image on the multimedia terminal, the scanning terminal parses the two-dimensional code image and obtains a service command, sends a service request to a service server according to the service command, and obtains service content corresponding to the service command; and the scanning terminal or the multimedia terminal receives and displays the service content.

The multimedia service pushing method based on two-dimensional code, wherein, the step of a multimedia terminal receiving both multimedia content and multimedia service information sent from a multimedia server, generating a two-dimensional code image according to the multimedia service information, and overlaying the two-dimensional code image onto the multimedia content for display further comprises:

the multimedia server generates the multimedia content based on the media information, and generates the multimedia service information based on the service characteristic information, as well as sends the multimedia data encoded by the multimedia content and the multimedia service information to the multimedia terminal;

the multimedia terminal receives the multimedia data before decoding to get the multimedia content and the multimedia service information, then, displays the multimedia content on the displayer of the multimedia terminal;

overlays the two-dimensional code image according to the multimedia service information onto the multimedia content for display.

The multimedia service pushing method based on two-dimensional code, wherein, the step of overlaying the two-dimensional code image generated according to the multimedia service information onto the multimedia content for display further comprises:

based on the multimedia contents and a preset correspondence table for displaying the multimedia service information, decides if the multimedia service information may be that being able to take effect instantly;

if it is yes, then generates the two-dimensional code image according to the multimedia service information;

if it is no, then decides again if the multimedia service information satisfies the preset displaying condition, based on the multimedia content and the correspondence table for displaying the multimedia service information, when it is yes, read and display the stored two-dimensional code image, when it is no, return to the step of deciding if the multimedia service information may be that being able to take effect instantly, based on the multimedia contents and the preset correspondence table for displaying the multimedia service information;

deciding if displaying the two-dimensional code or not, based on the preset correspondence table for displaying the multimedia service information;

if it is yes, then overlays the two-dimensional code image onto the multimedia content for display;

if it is no, then reads the saved two-dimensional code image according to the correspondence table for displaying the multimedia service information, and overlays the two-dimensional code image onto the multimedia content for display at a preset display time.

The multimedia service pushing method based on two-dimensional code, wherein, the multimedia content is one or a plurality of videos, audios, texts and web pages.

The multimedia service pushing method based on two-dimensional code, wherein, the service characteristic information includes at least a name, number and source address for obtaining of the service content.

A multimedia service pushing system based on two-dimensional code, wherein, it comprises:

a generation and displaying module, applied for the multimedia terminal to receiving the multimedia contents and the multimedia service information sent from the multimedia server, before generating the two-dimensional code image according to the multimedia service information, and overlaying onto the multimedia content for display;

a detection and obtaining module, applied to achieving the service command after parsing, when the scanning terminal detects the two-dimensional code image on the multimedia terminal, and sending the service request to the service server according to the service command, and obtaining the service contents according to the service command;

a receiving and displaying module, applied for the scanning terminal or multimedia terminal to receiving the service content before displaying.

The multimedia service pushing system based on two-dimensional code, wherein, the generation and displaying module further includes:

an encoding and transmitting unit, applied for the multimedia server to generating the multimedia content based on the multimedia information, and generating the multimedia service information based on the service characteristic information, as well as sending the multimedia data encoded by the multimedia content and the multimedia service information to the multimedia terminal;

a decoding and displaying unit, applied for the multimedia terminal to receiving the multimedia data, before decoding and getting the multimedia content and the multimedia service information, followed by displaying the multimedia content on the displayer of the multimedia terminal;

a transforming and displaying unit, applied to overlaying the two-dimensional code image according to the multimedia service information onto the multimedia content for display.

The multimedia service pushing system based on two-dimensional code, wherein, the transforming and displaying unit further includes:

a first judgment subunit, applied to determining if the multimedia service information may be the service information being able to take effect instantly, based on the correspondence table for displaying the multimedia service information;

a first control subunit, applied to generating the two-dimensional code image according to the multimedia service information, when it is yes;

a second control subunit, applied to deciding again if the multimedia service information satisfies the preset displaying conditions, based on the multimedia content and the correspondence table for displaying the multimedia service information, when it is yes, then reading and displaying the stored two-dimensional code image, when it is no, then starting the first judgment subunit;

a second judgment subunit, applied to deciding if the two-dimensional code image will be displayed or not, based on the correspondence table for displaying the multimedia service information;

a third control subunit, applied to overlaying the two-dimensional code image onto the multimedia content to display, when it is yes;

a fourth control subunit, applied to reading the saved two-dimensional code image based on the preset correspondence table for displaying the multimedia service information, and overlaying the two-dimensional code image onto the multimedia content for display at the preset display time.

The multimedia service pushing system based on two-dimensional code, wherein, the multimedia content is one or a plurality of videos, audios, texts and web pages.

The multimedia service pushing system based on two-dimensional code, wherein, the service characteristic information includes at least a name, number and source address for obtaining of the service content.

Benefits: The present invention generates a two-dimensional code image including a plurality of service commands on a multimedia terminal according to multimedia service information, and a user may achieve an effect of automatically acquiring a single or multiple pieces of service contents corresponding to the multimedia service information, through scanning and parsing the two-dimensional code images via a scanning terminal, the present invention may reduce a space occupation of the multimedia service information, being convenient to operate and control, and may bring great conveniences to users.

DETAILED DESCRIPTION OF EMBODIMENTS

The present invention provides a multimedia service pushing method based on two-dimensional code, and the system thereof, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
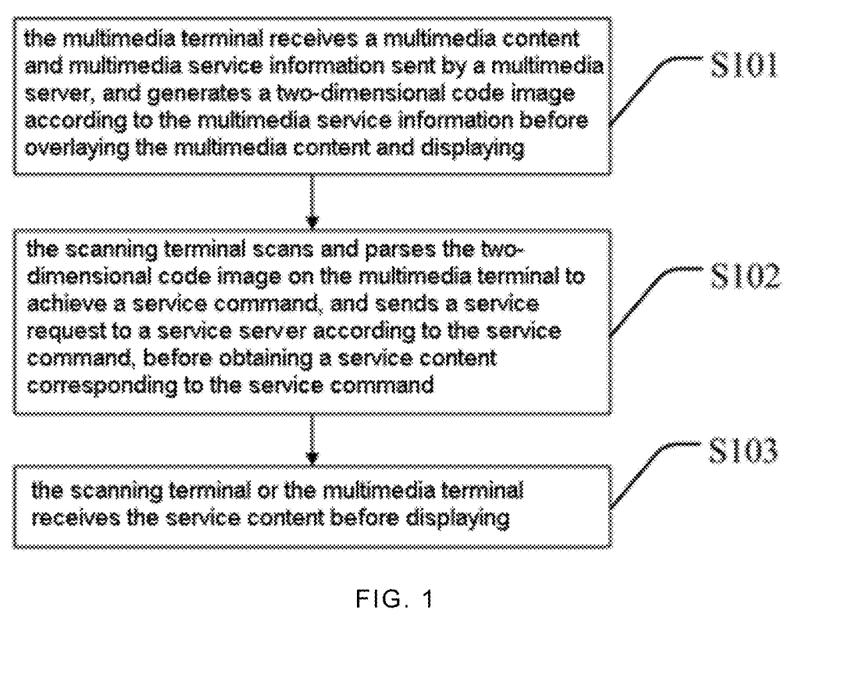
FIG. 1 illustrates a flowchart on a preferred embodiment of the multimedia service pushing method based on two-dimensional code as provided in the present invention.

Referencing to FIG. 1, which is a flow chart of a preferred embodiment on the multimedia service pushing method based on two-dimensional code as provided in the present invention. As shown in FIG. 1, it comprises the following steps:

S101, a multimedia terminal receives a multimedia content and multimedia service information sent from a multimedia server, and generates a two-dimensional code image according to the multimedia service information before overlaying the multimedia content for display.

S102, a scanning terminal scans and parses the two-dimensional code image on the multimedia terminal to achieve a service command, and sends a service request to a service server according to the service command, before obtaining a service content corresponding to the service command.

S103, the scanning terminal or the multimedia terminal receives the service content before displaying.

In the present embodiment, the multimedia server edits a medium to generate the multimedia content, edits service characteristic information to generate service information, and encodes both the multimedia content and the service information together into multimedia data before transmitting to the multimedia terminal.

The multimedia terminal receives multimedia data containing multimedia content and service information before decoding, and achieves both service information and multimedia contents accordingly, then, generates the two-dimensional code image including the service command according to the service information, and processes the multimedia content and the two-dimensional code image for display, before displaying both the multimedia content and the two-dimensional code image on a displayer.

Also, the multimedia terminal owns the following feathers: 1) if the received multimedia data has only the multimedia contents, instead of the multimedia service information, or the said multimedia service information having no characteristics of interest by the multimedia terminal, then, only the multimedia content will be processed and displayed without generating the two-dimensional code image; 2) if the received multimedia service information owns service information of a plurality of services, then, a plurality of two-dimensional code images including service commands according to different services will be generated, and when displaying the multimedia contents, a plurality of two-dimensional code images will either be displayed at the same time, or be saved and displayed at a different time; or the two-dimensional code image will be saved, and displayed when displaying other multimedia contents (for example, when the received present multimedia content contains a program 1 and a piece of service information 1, together with a two-dimensional code image 1 generated by the service information 1; and, the multimedia data received at other time is a program 2, then, it is also possible to display the two-dimensional code image 1 when displaying the program 2).

The scanning terminal scans the two-dimensional code image displayed on the multimedia terminal displayer, and achieves the service command after parsing, then according to the service command, sends a service request to the service servicer and achieves a service content before displaying on the scanning terminal, or pushes the service content to the multimedia terminal before showing on the displayer.

It can be seen that, the appearance of the two-dimensional code has provided a brand new pushing method for multimedia service information. The two-dimensional code is applied to recording a plurality of data symbol information by black and white special geometrical pattern distributed on a plane according to a plurality of certain laws, when encoding, it uses a bit stream concept of "0", "1" which constitutes an internal logic basis of a computer, and uses a plurality of binary geometry figures to express a text value information, then, with the help of an image reading device or a photoelectric scanning device, it is recognized automatically to achieve an automatic information processing; a two-dimensional code may carry a plurality of information or information links, it is very simple and pretty, also, the two-dimensional code has a good interaction and accession method, which may stimulate a consumer's activity. Therefore, adopting a two-dimensional code to deliver the multimedia service to a consumer is a good choice. However, since the two-dimensional code itself is an image, owing a pretty large capacity, it consumes extra bandwidth and other sources in transmitting. The present invention is generating a two-dimensional code image directly on the multimedia terminal, based on the multimedia service information sent from the multimedia server, instead of transmitting a generated two-dimensional code image to the multimedia terminal, thus need no extra bandwidth consumption.

Figure 2:
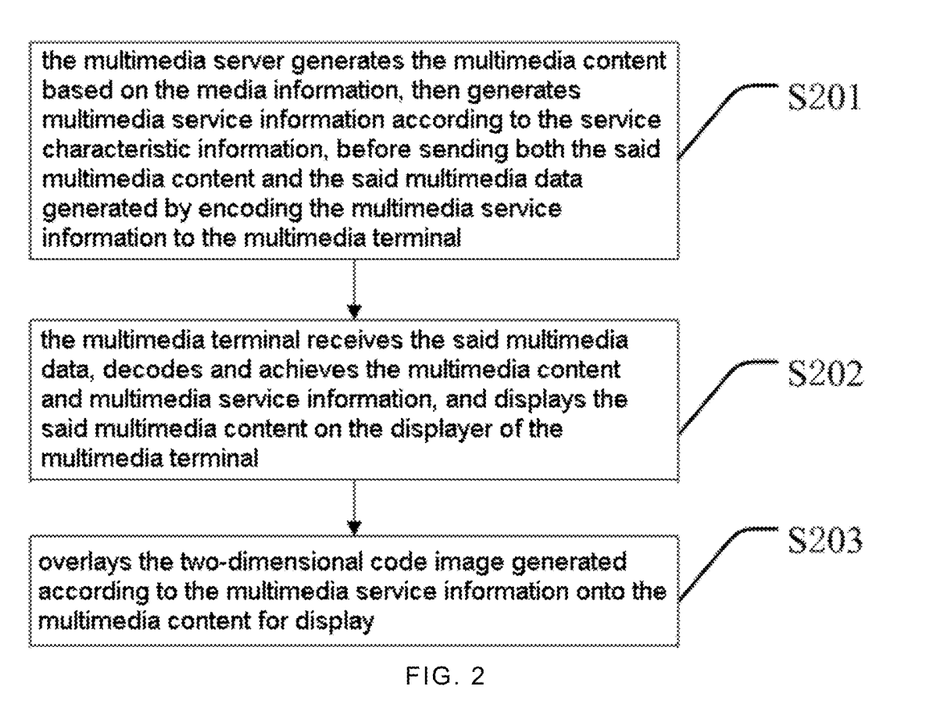
FIG. 2 illustrates a detailed flowchart on step S101 in the method shown in FIG. 1 as provided in the present invention.

A more preferred embodiment of the present invention, as shown in FIG. 2, wherein, the said step S101 comprises specifically:

S201, the multimedia server generates the multimedia content based on the media information, then generates multimedia service information according to the service characteristic information, before sending both the said multimedia content and the said multimedia data generated by encoding the multimedia service information to the multimedia terminal;

In specific implementations, the said multimedia content is one or a plurality of videos, audios, texts and web pages; the said service characteristic information comprises at least the name, number, and the source address for downloading.

S202, the multimedia terminal receives the said multimedia data, decodes and achieves the multimedia content and multimedia service information, and displays the said multimedia content on the displayer of the multimedia terminal;

S203, overlays the two-dimensional code image generated according to the multimedia service information onto the multimedia content for display.

Figure 3:
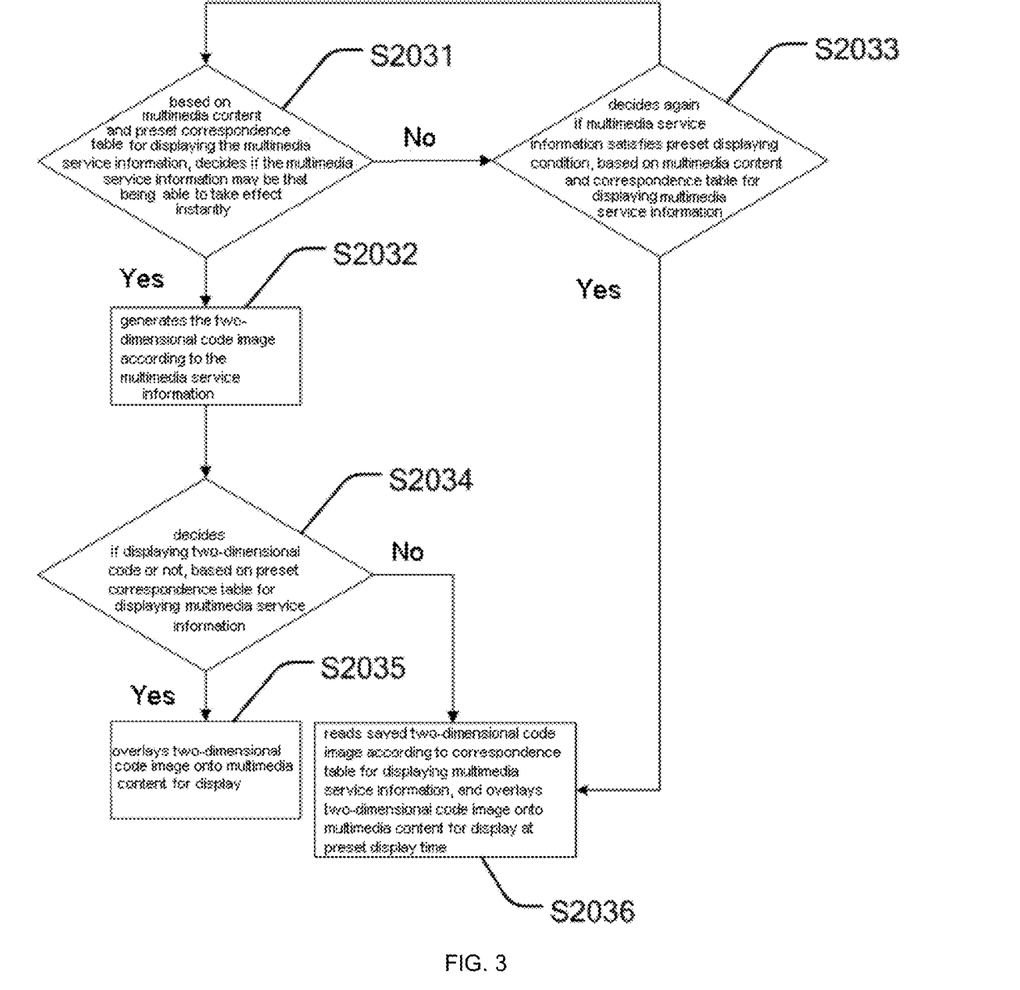
FIG. 3 illustrates a detailed flowchart on step S203 shown in FIG. 2 as provided in the present invention.

A more preferred embodiment of the present invention, as shown in FIG. 3, the said step S203 comprises in details:

S2031, based on the said multimedia content and a preset correspondence table for displaying the multimedia service information, decides if the said multimedia service information may be that being able to take effect instantly.

S2032, if it is yes, then generates the two-dimensional code image according to the said multimedia service information.

S2033, if it is no, then decides again if the said multimedia service information satisfies the preset displaying condition, based on the said multimedia content and the said correspondence table for displaying the multimedia service information, when it is yes, read and display the stored two-dimensional code image, when it is no, then return to the step S2031.

S2034, decides if displaying the said two-dimensional code or not, based on the preset correspondence table for displaying the multimedia service information.

The preset conditions in the said correspondence table for displaying the multimedia service information in the step S2031 and the step S2034, comprise but not limited to: deciding from the view of a plurality of scenes: when the multimedia content contains a certain scene is detected, then the saved two-dimensional code image needs to be read; deciding from the view of time: preset a plurality of certain time points, then the saved two-dimensional code image is read at the preset time points; as well as other conditions, for example, as long as there is no two-dimensional code image in the multimedia content, then the saved two-dimensional code image will be read and displayed.

S2035, if it is yes, then overlays the two-dimensional code image onto the multimedia content for display.

S2036, if it is no, then reads the saved two-dimensional code image according to the said correspondence table for displaying the multimedia service information, and overlays the two-dimensional code image onto the multimedia content for display at the preset display time.

When a multimedia server is transmitting the multimedia content, only the multimedia service information is needed to transmit, then the multimedia terminal will generate a service two-dimensional code according to the multimedia service information, and, the according service content to the multimedia service information will be achieved through the scanning device. To a multimedia server, there is no extra work needed, (usually, when a multimedia server is transmitting the multimedia contents, the information will always be transmitted, thus, it is only needed to modify the information to be the service information, instead of modifying the original information structure), no extra sources needed, (for a current service adopting two-dimensional code, usually the two-dimensional code is generated at the multimedia server. Then, in the case of a plurality of two-dimensional codes, a plurality of multimedia server sources will be needed; also, a two-dimensional code is an image, it owns a pretty large capacity itself, thus occupies a certain bandwidth sources in transmitting).

Figure 4:
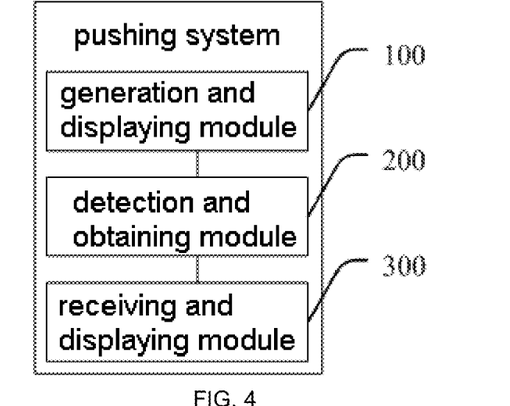
FIG. 4 illustrates a block diagram of a preferred embodiment on the multimedia service pushing method based on two-dimensional code as provided in the present invention.

Based on the above said methods, the present invention further provides a multimedia service pushing system based on the two-dimensional code, as shown in FIG. 4, it comprises:

A generation and displaying module 100, applied for the multimedia terminal to receiving the multimedia contents and the multimedia service information sent from the multimedia server, before generating the two-dimensional code image according to the multimedia service information, and overlaying onto the multimedia content for display;

A detection and obtaining module 200, applied to achieving the service command after parsing, when the scanning terminal detects the two-dimensional code image on the multimedia terminal, and sending the service request to the service server, according to the service command, and obtaining the service contents according to the service command;

A receiving and displaying module 300, applied for the scanning terminal or multimedia terminal to receiving the said service content before displaying.

Figure 5:
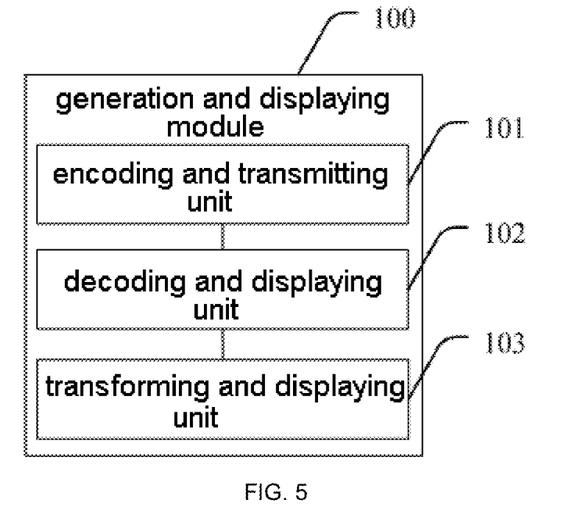
FIG. 5 illustrates a detailed block diagram of the generation and display modules in the system shown in FIG. 4 as provided in the present invention.

Further, as shown in FIG. 5, in the said multimedia service pushing system based on two-dimensional code, the said generation and displaying module 100 further includes:

An encoding and transmitting unit 101, applied for the multimedia server to generating the multimedia content based on the multimedia information, and generating the multimedia service information based on the service characteristic information, as well as sending the multimedia data encoded by the said multimedia content and the said multimedia service information to the multimedia terminal;

A decoding and displaying unit 102, applied for the multimedia terminal to receiving the said multimedia data, before decoding to get the multimedia content and the multimedia service information, then, displaying the said multimedia content on the displayer of the multimedia terminal;

A transforming and displaying unit 103, applied to overlaying the two-dimensional code image according to the multimedia service information onto the multimedia content for display.

Figure 6:
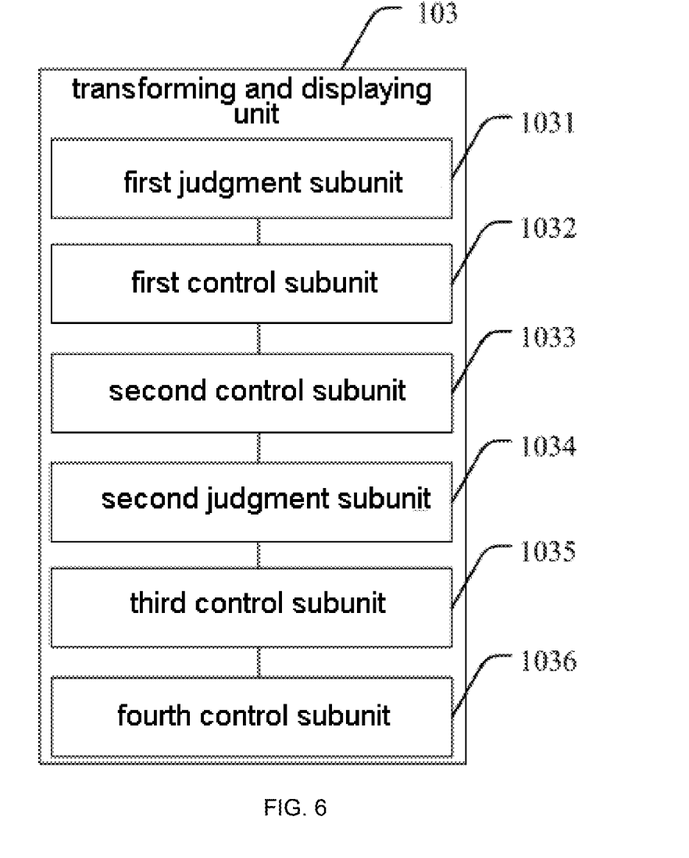
FIG. 6 illustrates a detailed block diagram of the transform and display unit in FIG. 5 as provided in the present invention.

Further, as shown in FIG. 6, in the said multimedia service pushing system based on two-dimensional code, the said transforming and displaying unit 103 further comprises:

A first judgment subunit 1031, applied to deciding if the said multimedia service information may be the service information being able to take effect instantly, based on the said correspondence table for displaying the multimedia service information;

A first control subunit 1032, applied to generating the two-dimensional code image according to the said multimedia service information, when it is yes;

A second control subunit 1033, applied to deciding again if the said multimedia service information satisfies the preset displaying conditions, based on the said multimedia content and the said correspondence table for displaying the multimedia service information, when it is yes, reading and displaying the stored two-dimensional code image, when it is no, then starting the first judgment subunit 1031;

A second judgment subunit 1034, applied to deciding if the said two-dimensional code image will be displayed or not, based on the said correspondence table for displaying the multimedia service information.

A third control subunit 1035, applied to overlaying the two-dimensional code image onto the multimedia content to display, when it is yes;

A fourth control subunit 1036, applied to reading the saved two-dimensional code image based on the preset correspondence table for displaying the multimedia service information, and overlaying the two-dimensional code image onto the multimedia content for display at the preset display time.

Further, in the said multimedia service pushing system based on two-dimensional code, the said multimedia content is one or a plurality of videos, audios, texts and web pages.

Further, in the said multimedia service pushing system based on two-dimensional code, the said service characteristic information comprises at least the name, number, and the source address for downloading.

All above, the present invention generates the two-dimensional code image including the service constructions on the multimedia terminal according to the multimedia service information, a user may acquire automatically single or multiple pieces of service content corresponding to the multimedia service information through scanning and parsing the two-dimensional code image via the scanning terminal, which reduces the space occupation of the multimedia service information, is convenient to operate and control, and brings great convenience to users.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A multimedia service pushing method based on two-dimensional code comprising:

receiving, by a multimedia terminal, both multimedia content and multimedia service information sent from a multimedia server;

determining whether the multimedia service information is taking effect instantly based on the multimedia content and a preset correspondence table;

when the multimedia service information is determined taking effect instantly, generating a two-dimensional code image according to the multimedia service information, and overlaying the two-dimensional code image onto the multimedia content for display;

when a scanning terminal detects the two-dimensional code image on the multimedia terminal, parsing, by the scanning terminal, the two-dimensional code image and obtaining a service command, sending a service request to a service server according to the service command, and obtaining service content corresponding to the service command; and receiving and displaying, by the scanning terminal or the multimedia terminal, the service content.

2. The multimedia service pushing method based on two-dimensional code according to claim 1, wherein, the multimedia content is one or a plurality of videos, audios, texts and web pages.

3. The multimedia service pushing method based on two-dimensional code according to claim 1, wherein the preset correspondence table is set based on a view of a plurality of scenes or a view of time.

4. A multimedia service pushing method based on two-dimensional code, comprising:
receiving, by a multimedia terminal, multimedia content and multimedia service information sent by a multimedia server,
determining whether the multimedia service information is taking effect instantly based on the multimedia content and a preset correspondence table,
when the multimedia service information is determined taking effect instantly, generating a two-dimensional code image according to the multimedia service information, and overlaying the two-dimensional code image on the multimedia content for display;
when a scanning terminal detects the two-dimensional code image on the multimedia terminal, parsing, by the scanning terminal, the two-dimensional code image to obtain a service command, sending a service request to a service server according to the service command, and obtaining service content corresponding to the service command; and
receiving, by the scanning terminal or the multimedia terminal, the service content and displaying the service content;
wherein the step of receiving, by the multimedia terminal, the multimedia content and the multimedia service information sent by the multimedia server, generating the two-dimensional code image according to the multimedia service information, and overlaying the two-dimensional code image on the multimedia content for display further comprises:
generating, by the multimedia server, the multimedia content based on the media information, and generating the multimedia service information based on the service characteristic information, as well as sending the multimedia data encoded by the multimedia content and the multimedia service information to the multimedia terminal;
receiving, by the multimedia terminal, the multimedia data before decoding to get the multimedia content and the multimedia service information, then, displaying the multimedia content on the displayer of the multimedia terminal; and
overlaying the two-dimensional code image according to the multimedia service information onto the multimedia content for display.

5. The multimedia service pushing method based on two-dimensional code according to claim 4, wherein
when the multimedia service information is determined not taking effect instantly, then deciding again if the multimedia service information satisfies the preset displaying condition, based on the multimedia content and the correspondence table for displaying the multimedia service information, when it is yes, reading and displaying the stored two-dimensional code image, when it is no, then returning to the step of deciding if the multimedia service information may be that being able to take effect instantly, based on the multimedia contents and the preset correspondence table for displaying the multimedia service information;
deciding if displaying the two-dimensional code or not, based on the preset correspondence table for displaying the multimedia service information;
if it is yes, then overlaying the two-dimensional code image onto the multimedia content for display;
if it is no, then reading the save two-dimensional code image according to the correspondence table for displaying the multimedia service information, and overlaying the two-dimensional code image onto the multimedia content for displaying at the preset display time.

6. The multimedia service pushing method based on two-dimensional code according to claim 5, wherein, the multimedia content is one or a plurality of videos, audios, texts and web pages.

7. The multimedia service pushing method based on two-dimensional code according to claim 5, wherein, the service characteristic information includes at least the name, number and source address for obtaining of the service content.

8. The multimedia service pushing method based on two-dimensional code according to claim 7, wherein, the multimedia content is one or a plurality of videos, audios, texts and web pages.

9. The multimedia service pushing method based on two-dimensional code according to claim 4, wherein the preset correspondence table is set based on a view of a plurality of scenes or a view of time.

10. The multimedia service pushing method based on two-dimensional code according to claim 4, wherein, the service characteristic information includes at least the name, number and source address for obtaining of the service content.

11. The multimedia service pushing method based on two-dimensional code according to claim 10, wherein, the multimedia content is one or a plurality of videos, audios, texts and web pages.

12. The multimedia service pushing method based on two-dimensional code according to claim 4, wherein, the multimedia content is one or a plurality of videos, audios, texts and web pages.

13. A multimedia service pushing system based on two-dimensional code, comprising:
a generation and displaying module, applied for the multimedia terminal to receive the multimedia content and the multimedia service information sent from the multimedia server, before generating the two-dimensional code image according to the multimedia service information, and to overlay onto the multimedia content for display;
a detection and obtaining module, applied to achieve the service command after parsing, when the scanning terminal detects the two-dimensional code image on the multimedia terminal, to send the service request to the service server, according to the service command, and to obtain the service contents according to the service command; and
a receiving and displaying module, applied for the scanning terminal or multimedia terminal to receive the service content before displaying;
wherein, the transforming and displaying unit further includes:
a first judgment subunit, applied to determine if the multimedia service information may be able to take effect instantly, based on the multimedia content and a preset correspondence table;

a first control subunit, applied to generate the two-dimensional code image according to the multimedia service information, when the multimedia service information is determined taking effect instantly.

14. The multimedia service pushing system based on two-dimensional code according to claim 13, wherein, the generation and displaying module further includes:
an encoding and transmitting unit, applied for the multimedia server to generate the multimedia content based on the multimedia information, to generate the multimedia service information based on the service characteristic information, as well as to send the multimedia data encoded by the multimedia content and the multimedia service information to the multimedia terminal;
a decoding and displaying unit, applied for the multimedia terminal to receive the multimedia data, before decoding and getting the multimedia content and the multimedia service information, followed by displaying the multimedia content on the displayer of the multimedia terminal;
a transforming and displaying unit, applied to overlay the two-dimensional code image according to the multimedia service information onto the multimedia content for display.

15. The multimedia service pushing system based on two-dimensional code according to claim 14, wherein, the transforming and displaying unit further includes:
a second control subunit, applied to decide again if the multimedia service information satisfies the preset displaying conditions, based on the multimedia content and the correspondence table for displaying the multimedia service information, when it is yes, then reading and displaying the stored two-dimensional code image, when it is no, then starting the first judgment subunit;
a second judgment subunit, applied to decide if the two-dimensional code image will be displayed or not, based on the correspondence table for displaying the multimedia service information;
a third control subunit, applied to overlay the two-dimensional code image onto the multimedia content to display, when it is yes;
a fourth control subunit, applied to read the saved two-dimensional code image based on the preset correspondence table for displaying the multimedia service information, and to overlay the two-dimensional code image onto the multimedia content for display at the preset display time.

16. The multimedia service pushing system based on two-dimensional code according to claim 14, wherein, the service characteristic information includes at least a name, number and source address for obtaining of the service content.

17. The multimedia service pushing system based on two-dimensional code according to claim 13, wherein, the multimedia content is one or a plurality of videos, audios, texts and web pages.

18. The multimedia service pushing system based on two-dimensional code according to claim 13, wherein the preset correspondence table is set based on a view of a plurality of scenes or a view of time.

* * * * *